3,067,242
DI-(N,N-DIMETHYLOCTADECYLAMINE) PAMOATE

Clifford E. Larrabee, New London, Conn., assignor to Chas. Pfizer & Co. Inc., New York, N.Y., a corporation of Delaware
No Drawing. Filed Aug. 31, 1959, Ser. No. 836,917
1 Claim. (Cl. 260—501)

This invention is concerned with a new and relatively non-toxic compound having antitumor and anthelmintic activity. More specifically, it is concerned with di-(N,N-dimethyloctadecylamine) pamoate.

The novel and valuable compound of the present invention has the following structural formula:

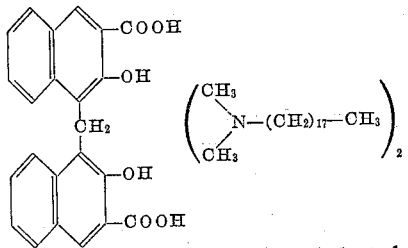

and is prepared by treating N,N-dimethyloctadecylamine with 1,1'-methylene-bis-2-hydroxy-3-naphthoic acid, known trivially as pamoic acid, in a 2 to 1 molar ratio in a suitable solvent medium. It is a white to off-white solid, soluble in alcohols and acetone and only slightly soluble in water. It melts at 73°–77° C. It is readily obtained in pure crystalline form by recrystallization from acetonitrile.

Di-(N,N-dimethyloctadecylamine) pamoate has been found to possess substantial anthelmintic activity. It is particularly valuable in this respect since it is relatively non-toxic and characterized by high levels of activity for extended periods of time.

Compositions comprising di-(N,N-dimethyloctadecylamine) pamoate in an orally administrable carrier are especially effective in treating infestations of tapeworms and pinworms and show activity against *Nematospiroides dubius*.

Use of these compositions for the treatment of helminthiasis in man and animals involves intestinal contact of the infecting helminth with the drug. Dosage is preferably by the oral route, since the major site of infection is ordinarily the intestinal tract. It is of course possible to administer these drugs rectally, but this method is not so convenient as oral medication. One of the attributes of these new drugs is that they are highly effective orally. The daily dose required varies with the particular composition employed and the animal or human being treated.

For the treatment of domestic animals, a single dose of one of the new compositions containing an amount of the amine from about 75 to 300 mg./kg. of body weight is generally sufficient to clear the animal of the infecting parasite. Doses as low as 10–25 mg./kg. can be used if repeated on three or more consecutive days. Generally higher dosage levels are preferred for pinworm infestations than are necessary in treating tapeworms, from about 100 to 200 mg./kg. for tapeworms and from about 175 to 275 mg./kg. for pinworms being most satisfactory. Administration of the compositions to animals can best be effected by mixing the drug with the feed. Thus, the required dose for the animal is calculated on the basis of the above formula and the drug is then blended with all or a portion of the animal's daily ration. The compound can be supplied in substantially pure form, or it can be diluted with inert carriers such as starch, lactose, etc. This is preferred with small animals where the total dosage is low, since blending of only a few milligrams of drug with a relatively large amount of feed is inconvenient. For this purpose a dry solid composition containing the calculated dosage of the compound is blended with a convenient amount of carrier, generally from about 1 to 10 parts by weight based on the weight of the amine.

Boluses and capsules are also used for the therapeutic treatment of animals. For animals weighing from 30 to 1000 pounds the usual dose ranges from ½ to 15 grams. Boluses of suitable sizes containing these quantities of materials can be prepared by conventional methods. However, for a 15 g. dose, it is frequently more convenient to employ two or more boluses of smaller size rather than a single bolus containing this quantity of material.

In humans, as with animals, the dosage varies with the size of the patient. Two courses of treatment with the anthelmintic dosage form, each lasting approximately one week separated by a rest period of about one week, are preferred for the treatment of pinworm, for example. A single course of treatment may be used, especially with other infestations like tapeworm.

For human and household pet dosages, the di-(N,N-dimethyloctadecylamine) pamoate can be compounded into any of the usual oral dosage forms including capsules, tablets, and liquid preparations such as elixirs and suspensions containing various coloring, flavoring and taste masking substances. The active anthelmintic ingredient for this purpose can be diluted with various tableting materials such as starches of various types, calcium carbonate, lactose, sucrose, and dicalcium phosphate to simplify the tableting and capsuling process. A minor proportion (1–2%) of magnesium stearate is useful as a lubricant.

For the preliminary anthelmintic evaluation of the valuable compositions of the present invention, a group of mice infected with tapeworms (*Hymenolepsis nana*) is used. The mice are first treated prophylactically on the first three days of the experiment and then inoculated orally with ova of *H. nana*. The mice are then held until ova occur in feces of the controls, generally the fourteenth day. Therapeutic treatment is then started and continued for three days. The animals are sacrified and examined for helminths. When administered at the rate of 200 mg./kg. of body weight, five out of ten mice treated are cleared of infestation.

For the preliminary anthelmintic evaluation of the valuable compositions of the present invention, a group of mice infected with pinworm (*S. obvelata*) is used. The test mice are readily infected by associating them with naturally infected mice known as source mice. The experimental mice acquired their infections over a number of days and therefore harbored worms in several stages of development when treated with the test compounds. This technique is described by Kam-Fai Chan in The American Journal of Hygiene, volume 56, pages 22–30 (1952). The test mice are housed for a period of eight days with the source mice, during which time they too become infested with the pinworm, which is very similar in its host-parasite relationship to the nematodes of human and veterinary importance. On the eighth day after exposure to the source mice, the di-(N,N-dimethyloctadecylamine)pamoate dosage forms under study are administered to the test mice by the oral route. The treated mice and untreated control groups are then sacrificed on the ninth day, and all stages of *S. obvelata* in the cecum are counted.

Di-(N,N-dimethyloctadecylamine) pamoate has been found to exhibit anti-tumor activity against mammary adenocarcinoma CA–755 according to the procedure of Gellhorn et al. (Cancer Research, Supplement III, page 38, 1955), in which treated groups of ten animals each are employed together with untreated controls. Dosage is 0.5 cc. daily in all cases. Therapy is initiated one day after transplantation of the tumor and is continued for 12 days. At the conclusion of the experiment the animals are weighed and sacrificed, and the tumors are excised and weighed. The compounds of the present invention are found to possess remarkably high potency for inhibiting growth of the tumors at tolerated dosages. Furthermore, even where the tumor is permitted to become established by delaying the initiation of treatment for 6 days, retardation of growth is achieved. In addition to intraperitoneal administration, treatment by the oral route is also effective.

It also exhibits activity against Crocker Sarcoma 180 in mice. According to the procedure described by Reilly et al. (Cancer Research, vol. 13, No. 9, pages 684–7, September 1953), the substance under test is dissolved in sterile 0.85% aqueous saline. Small, uniformly cut pieces of seven-day-old tumor S–180 are implanted subcutaneously in the axillary region of Swiss white mice weighing 18 to 22 g. Each animal receives an implant, and the animals are divided into groups of six each. Intraperitoneal administration of the solution under test in doses of 0.5 cc. twice daily is begun 24 hours after implantation of the tumor and continued for a total of 13 injections. One group from each donor tumor is maintained as a control and receives injections of 0.85% saline. On the eighth day after tumor implantation the surviving animals are weighed to provide a measure of the toxic effect of the drug. The animals are then sacrificed and the tumors are excised and weighed. The weights for each group are averaged and the averages for the treated animals are expressed as percentages of the averages for the control groups. In this test it is found that the compound of the present invention retards tumor growth to a marked degree at tolerable dosage levels.

This substance exhibits very high effectiveness when administered by either the oral or the parenteral route. The oral route is frequently preferred because of its convenience.

For this application also, various pharmaceutical preparations can be advantageously compounded which contain the active substance along with liquid or solid diluents. Solid preparations for extemporaneous dilution may be formulated employing various buffering agents as well as local anethetics and other medicinal agents such as antibiotics, hypnotics, analgesics, etc., and inorganic salts to afford desirable pharmacological properties to the composition. Since this active substance is stable and widely compatible, it may be administered in solution or suspension in a variety of pharmacologically acceptable vehicles, including water, propylene glycol, diethylcarbonate, glycerol, or oils such as peanut oil or sesame oil.

Doses of the order of from about 25 to about 80 mg./kg. of the compound of the present invention are highly effective in inhibiting tumors in mice. The concentration of the active ingredient in the carrier will usually be at least about 0.1% by weight.

In addition, this valuable active substance may be employed in combination with one or more other carcinostatic agents. For this purpose, compositions containing from 10 to 90% of the compounds of the present invention are useful. Known carcinostatic agents which may be employed in such combinations include the nitrogen mustard type carcinostats, 6-mercaptopurine, 8-azaguanine, urethane, 6-diazo-5-oxo-1-norleucine, azaserine, triethylenemelamine, mitocycin C, triethylenephosphoramide, 1,4-dimethylsulfonyloxybutane, the carcinostatic folic acid analogs, and the like.

The following examples are provided by way of illustration, and are not intended to limit this invention, the scope of which is indicated by the appended claims.

EXAMPLE I

To 38.8 g. (0.1 mole) of pamoic acid suspended in 150 ml. of acetone is added 59.5 g. (0.2 mole) of N,N-dimethyloctadecylamine in 300 ml. of acetone. The mixture is heated and stirred at 50° C. until a clear solution results, then concentrated to about 250 ml. volume and 100 ml. of acetonitrile added. The product which precipitates is removed by filtration and dried; M.P. 65°–67° C. Recrystallization from two liters of acetonitrile gives the pure product; M.P. 73–77° C.

*Analysis.*—Calcd. for $C_{63}H_{102}N_2O_6$: 76.93% C, 10.45% H, 2.85% N. Found: 76.81% C, 10.48% H, 3.05% N.

EXAMPLE II

The procedure of Example I is repeated using 2 liters of acetonitrile as solvent and refluxing the mixture until a clear solution is obtained. The product which precipitates upon cooling is removed by filtration and dried.

EXAMPLE III

One part by weight of di-(N,N-dimethyloctadecylamine) pamoate is mixed with nineteen parts by weight of the usual granular stock of salt (sodium chloride). The mixture is thoroughly blended and fed to the animals in such quantities as to provide the recommended daily dose. Incorporation of such salt mixture into block form is not desirable due to lack of control of the dosage size received by the animal.

EXAMPLE IV

To a commercially available raspberry-flavored sugar syrup is added the equivalent of 100 mg. of di-(N,N-dimethyloctadecylamine) pamoate per milliliter, and the mixture homogenized in a mechanical device for this purpose. Daily administration of one half teaspoonful of the resulting elixir per day for a period of 14 days successfully cleared a 30 pound child of tapeworm infestation.

EXAMPLE V

A cereal-type medicated feed suitable for administration to hogs is prepared containing di-(N,N-dimethyloctadecylamine) pamoate in such quantities that ¼ of the animal's daily ration contains 40 mg./kg. of body weight of the compound. This is then fed to infected animals for the successful treatment of tapeworms. The balance of the diet is nutritionally balanced feed stuff on hand.

EXAMPLE VI

An aqueous suspension is prepared containing 50 mg. per teaspoonful (5 ml.) of di-(N,N-dimethyloctadecylamine)-pamoate in a vehicle composed of U.S.P. simple syrup containing the following materials per 100 ml. of vehicle:

| | |
|---|---|
| F.D. & C. yellow No. 5 _____ mg__ | 5 |
| Carboxymethylcellulose, low viscosity type ____ mg__ | 1 |
| Synthetic lemon flavor _____ ml__ | 0.1 |

This suspension is particularly well adapted for administration to children unwilling or unable to swallow tablets or capsules.

EXAMPLE VII

The following materials are thoroughly blended and then compressed into tablets each containing 125 mg. of di-(N,N-dimethyloctadecylamine) pamoate. The total table weight is 500 mg.

| | Gms. |
|---|---|
| Di-(N,N-dimethyloctadecylamine) pamoate _____ | 12.5 |
| Starch _____ | 12.5 |
| Lactose _____ | 24.5 |
| Magnesium stearate _____ | 0.5 |

Four of these tablets taken twice daily for five days are sufficient to clear a 60 pound child of a tapeworm infestation.

EXAMPLE VIII

Di-(N,N-dimethyloctadecylamine) pamoate is tested for effectiveness in inhibiting the growth of adenocarcinoma CA-755 according to the procedure of Gellhorn, et al. (loc. cit.). Administration is by the intraperitoneal route in each case. Results obtained are given in Table I.

*Table I*

| Dosage, mg./kg. | Body weight change (g.) treated/control | Survival rate | Percent inhibition |
|---|---|---|---|
| 25 | 0/0 | 9/10 | 74 |
| 25 | 0/+3 | 9/10 | 41 |
| 25 | -1/0 | 8/10 | 54 |

EXAMPLE IX

Di-(N,N-dimethyloctadecylamine) pamoate is tested for effectiveness in inhibiting the growth of Sarcoma 180 following the procedure of Reilly et al. (loc. cit.) with results reported in Table II.

*Table II*

| Dosage, mg./kg. | Body weight change (g.) treated/control | Survival rate | Percent inhibition |
|---|---|---|---|
| 100 | | 0/6 | |
| 25 | -1/+1 | 6/6 | 57 |

What is claimed is:

The compound di-(N,N-dimethyloctadecylamine) pamoate.

References Cited in the file of this patent

UNITED STATES PATENTS

| | | |
|---|---|---|
| 1,872,826 | Schulemann et al. | Aug. 23, 1932 |
| 2,366,534 | Kirby | Jan. 2, 1945 |
| 2,868,692 | Bach | Jan. 13, 1959 |
| 2,868,833 | Szabo | Jan. 13, 1959 |
| 2,890,982 | Natt | June 16, 1959 |
| 2,900,411 | Harwood | Aug. 18, 1959 |
| 2,925,417 | Elslager et al. | Feb. 16, 1960 |

OTHER REFERENCES

Reamer: Chem. Abst., vol. 50 (1956), page 3754D. (Copy in Pat. Off. Sci. Library.)